United States Patent
Le et al.

(10) Patent No.: US 9,508,393 B1
(45) Date of Patent: Nov. 29, 2016

(54) HARD DISK DRIVE ENCLOSURE BASE WITH A HELIUM SEALED GASKET

(71) Applicant: Western Digital Technologies, Inc., Irvine, CA (US)

(72) Inventors: Lynn Bich-Quy Le, San Jose, CA (US); Thomas J. Hitchner, San Martin, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/852,333

(22) Filed: Sep. 11, 2015

Related U.S. Application Data

(60) Provisional application No. 62/184,790, filed on Jun. 25, 2015.

(51) Int. Cl.
*G11B 33/14* (2006.01)

(52) U.S. Cl.
CPC ......... *G11B 33/1466* (2013.01); *G11B 33/148* (2013.01); *G11B 33/1453* (2013.01)

(58) Field of Classification Search
None
See application file for complete search history.

(56) References Cited

U.S. PATENT DOCUMENTS

| | | | |
|---|---|---|---|
| 4,896,231 A * | 1/1990 | Hoppe | G11B 33/1466 360/99.15 |
| 5,150,267 A * | 9/1992 | Reinisch | G11B 25/043 360/99.19 |
| 5,235,482 A | 8/1993 | Schmitz | |
| 5,282,101 A * | 1/1994 | Reinisch | G11B 25/043 360/99.19 |
| 5,568,341 A * | 10/1996 | Shikano | G11B 33/1466 360/99.18 |
| 5,793,566 A * | 8/1998 | Scura | G11B 33/1466 360/99.18 |
| 5,916,652 A * | 6/1999 | Miner | B32B 7/06 283/81 |
| 6,046,889 A | 4/2000 | Berding et al. | |
| 6,052,890 A | 4/2000 | Malagrino, Jr. et al. | |
| 6,061,206 A | 5/2000 | Foisy et al. | |
| 6,101,876 A | 8/2000 | Brooks et al. | |
| 6,147,831 A | 11/2000 | Kennedy et al. | |
| 6,151,189 A | 11/2000 | Brooks | |
| 6,151,197 A | 11/2000 | Larson et al. | |
| 6,185,067 B1 | 2/2001 | Chamberlain | |
| 6,185,074 B1 | 2/2001 | Wang et al. | |
| 6,208,486 B1 | 3/2001 | Gustafson et al. | |
| 6,215,616 B1 | 4/2001 | Phan et al. | |
| 6,266,207 B1 * | 7/2001 | Iwahara | G11B 33/08 360/99.18 |
| 6,272,694 B1 | 8/2001 | Weaver et al. | |
| 6,288,866 B1 | 9/2001 | Butler et al. | |
| 6,292,333 B1 | 9/2001 | Blumentritt et al. | |
| 6,344,950 B1 | 2/2002 | Watson et al. | |
| 6,349,464 B1 | 2/2002 | Codilian et al. | |
| 6,388,873 B1 | 5/2002 | Brooks et al. | |
| 6,417,979 B1 | 7/2002 | Patton, III et al. | |
| 6,421,208 B1 | 7/2002 | Oveyssi | |
| 6,441,998 B1 | 8/2002 | Abrahamson | |

(Continued)

FOREIGN PATENT DOCUMENTS

| | | | | |
|---|---|---|---|---|
| DE | WO 2013010497 A1 * | 1/2013 | | F16J 15/102 |
| EP | 0915273 A2 * | 5/1999 | | F16J 15/123 |

(Continued)

*Primary Examiner* — Will J Klimowicz

(57) ABSTRACT

A sealing gasket sheet and a storage drive are provided. The sealing gasket sheet includes a first adhesive layer, a metal layer disposed adjacent to the first adhesive layer, and a second adhesive layer disposed adjacent to the metal layer. The storage drive includes an enclosure formed by a storage drive base and a cover with the sealing gasket sheet between the storage drive base and the cover.

14 Claims, 7 Drawing Sheets

(56) References Cited

U.S. PATENT DOCUMENTS

| | | |
|---|---|---|
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,525,899 B2 | 2/2003 | Hearn et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,536,555 B1 | 3/2003 | Kelsic et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,577,468 B2 | 6/2003 | Daniel et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,631,049 B2 | 10/2003 | Satoh et al. |
| 6,654,200 B1 | 11/2003 | Alexander et al. |
| 6,657,811 B1 | 12/2003 | Codilian |
| 6,661,597 B1 | 12/2003 | Hanan et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,703,078 B2 * | 3/2004 | Miyashita .............. B32B 15/06 427/379 |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,746,740 B1 * | 6/2004 | McGuire, Jr. .......... C09J 7/0225 428/352 |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,889,984 B2 * | 5/2005 | Hatanaka ........... G11B 33/1466 277/650 |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,016,145 B2 | 3/2006 | Gunderson et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,119,984 B2 | 10/2006 | Macleod et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |

(56) References Cited

U.S. PATENT DOCUMENTS

| | | |
|---|---|---|
| 7,212,377 B1 | 5/2007 | Ou-Yang et |
| 7,215,513 B1 | 5/2007 | Chang et al. |
| 7,215,514 B1 | 5/2007 | Yang et al. |
| 7,218,473 B2 | 5/2007 | Bernett et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,323,075 B1 * | 1/2008 | Sagan .................. A47H 23/04 156/196 |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,362,541 B2 | 4/2008 | Bernett et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,389,992 B2 | 6/2008 | Isono |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,692,891 B2 | 4/2010 | Hatchett et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,914,858 B1 | 3/2011 | deJesus et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,564,900 B2 | 10/2013 | Hirono et al. |
| 8,599,514 B2 | 12/2013 | McGuire, Jr. |
| 8,616,900 B1 | 12/2013 | Lion |
| 8,652,601 B2 * | 2/2014 | Iwasaki .................. B32B 25/14 428/141 |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |

(56) References Cited

U.S. PATENT DOCUMENTS

| | | |
|---|---|---|
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 8,854,766 B1 * | 10/2014 | Gustafson .......... G11B 33/1486 360/97.12 |
| 8,992,712 B2 * | 3/2015 | Loy .................... H01L 21/2007 156/247 |
| 9,025,279 B2 | 5/2015 | Furuta et al. |
| 9,036,295 B1 | 5/2015 | Casey et al. |
| 9,208,825 B1 * | 12/2015 | Gustafson .......... G11B 33/1486 |
| 2005/0221052 A1 * | 10/2005 | Akiyoshi .................. B32B 7/12 428/66.4 |
| 2005/0253342 A1 | 11/2005 | Hampton |
| 2011/0212281 A1 | 9/2011 | Jacoby et al. |
| 2013/0038964 A1 | 2/2013 | Garbarino et al. |
| 2013/0075027 A1 * | 3/2013 | Sheridan ................ B32B 27/00 156/249 |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

FOREIGN PATENT DOCUMENTS

| | | | |
|---|---|---|---|
| JP | 07320474 A | * 12/1995 | |
| JP | 2008071410 A | * 3/2008 | |
| JP | 2008071412 A | * 3/2008 | |
| JP | 2008071413 A | * 3/2008 | |
| TW | EP 2169683 A1 | * 3/2010 | .......... G11B 33/025 |

\* cited by examiner

HARD DISK DRIVE ENCLOSURE BASE WITH A HELIUM SEALED GASKET

This application claims benefit of priority from Provisional U.S. Patent application Ser. No. 62/184,790, filed Jun. 25, 2015, the contents of which are incorporated by reference.

BACKGROUND

The introduction of lasers to heads in some types of storage drives may increase oxidation within the storage drive. Using inert gases, such as Helium, to fill the storage drive may allow safer operation by reducing oxidation within the drive. Additionally, the reduced density of inert gas may also reduce the aerodynamic drag and allow the head to fly at lower heights, which may intern save power consumption and reduce vibration and/or friction. However, maintaining inert gases within the drive may require improved sealing of the drive while still allowing electrical connection between the exterior of the drive and the internal electrics within the housing.

BRIEF DESCRIPTION OF THE DRAWINGS

A general architecture that implements features of the disclosure will now be described with reference to the drawings. The drawings and the associated descriptions are provided to illustrate embodiments of the disclosure and not to limit the scope of the disclosure. Through the drawings, reference numbers are reused to indicate correspondence between referenced elements.

DETAILED DESCRIPTION

The subject matter described herein is taught by way of example embodiments. Various details may be omitted for the sake of clarity and to avoid obscuring the subject matter described.

Figure 1:
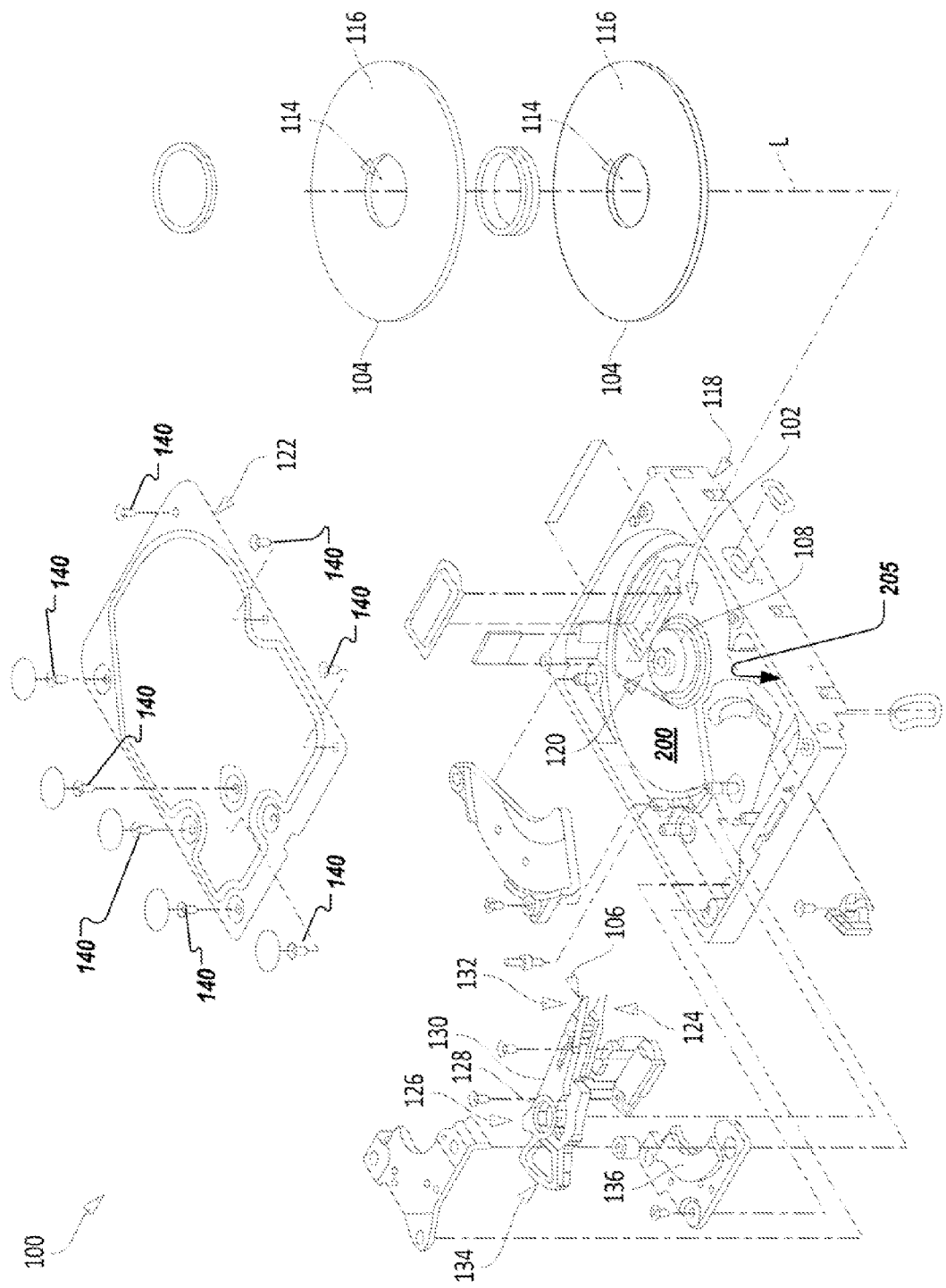
FIG. 1 is an exploded, perspective view generally illustrating a storage device.

FIG. 1 is an exploded, perspective view generally illustrating storage device 100. Referring to FIG. 1, a storage device 100 is illustrated, according to one embodiment. The storage device 100 comprises a hub 102, a media 104 physically contacting and supported by at least one mounting surface (not labeled) of the hub 102, and a head 106 operable to write to and read from the media 104. In one embodiment, the hub 102 comprises a substantially cylindrical portion 108 which defines a longitudinal axis L and a mounting surface substantially normal to the longitudinal axis L, the mounting surface extending radially outward.

As illustrated in FIG. 1, a storage device 100 comprises a magnetic disk drive, and the structures and methods described herein will be described in terms of such a disk drive. However, these structures and methods may also be applied to and/or implemented in other storage devices, including, e.g., solid-state hybrid drives (SSHD), optical and magneto-optical disk drives. Solid-state hybrid drives may additionally include non-volatile memory (e.g., flash).

The media 104 may comprise any of a variety of magnetic or optical disk media having a substantially concentric opening 114 defined there through. Of course, in other embodiments, the storage device 100 may include more or fewer disks. For example, the storage device 100 may include one disk or it may include two or more disks. The media 104 each include a disk surface 116, as well as an opposing disk surface not visible in FIG. 1 above. In one embodiment, the disk surfaces 116 comprise a plurality of generally concentric tracks for storing data.

As illustrated, the hub 102 may be coupled to and support the media 104. The hub 102 may also be rotatably attached to a storage drive base 118 of the storage device 100, and may form one component of a motor 120 (e.g., a spindle motor). The motor 120 and the hub 102 may be configured to rotate the media 104 about the longitudinal axis L.

Further, a disk clamp may be coupled to the hub 102 to provide a downward clamping force to the media 104. Specifically, the disk clamp may be positioned above the media 104 and attached to an upper surface of the hub 102. The interaction of the disk clamp and the hub 102 provides downward clamping force.

The storage device 100 may further include a cover 122, which, together with the storage drive base 118, may form a sealed enclosure to house the media 104 and the motor 120. In some embodiments, the cover 122 may be attached to the storage drive base 118 by a plurality of screws 140. However, as discussed below, the need for screws 140 to attach the cover 122 to the storage drive base 118 may be rendered moot in some example embodiments.

The storage device 100 may also include a head stack assembly ("HSA") 124 rotatably attached to the storage drive base 118. The HSA 124 may include an actuator 126 comprising an actuator body 128 and one or more actuator arms 130 extending from the actuator body 128. The actuator body 128 may further be configured to rotate about an actuator pivot axis.

One or two head gimbal assemblies ("HGA") 132 may be attached to a distal end of each actuator arm 130. Each HGA 132 includes a head 106 operable to write to and read from a corresponding media 104. The HSA 124 may further include a coil 134 through which a changing electrical current is passed during operation. The coil 134 interacts with one or more magnets 136 that are attached to the storage drive base 118 to form a voice coil motor ("VCM") for controllably rotating the HSA 124.

The head 106 may comprise any of a variety of heads for writing to and reading from a media 104. In magnetic recording applications, the head 106 may include an air bearing slider and a magnetic transducer that includes a writer and a read element. The magnetic transducer's writer may be of a longitudinal or perpendicular design, and the read element of the magnetic transducer may be inductive or magneto resistive. In optical and magneto-optical recording applications, the head 106 may include a mirror and an objective lens for focusing laser light on to an adjacent disk surface.

Figure 2:
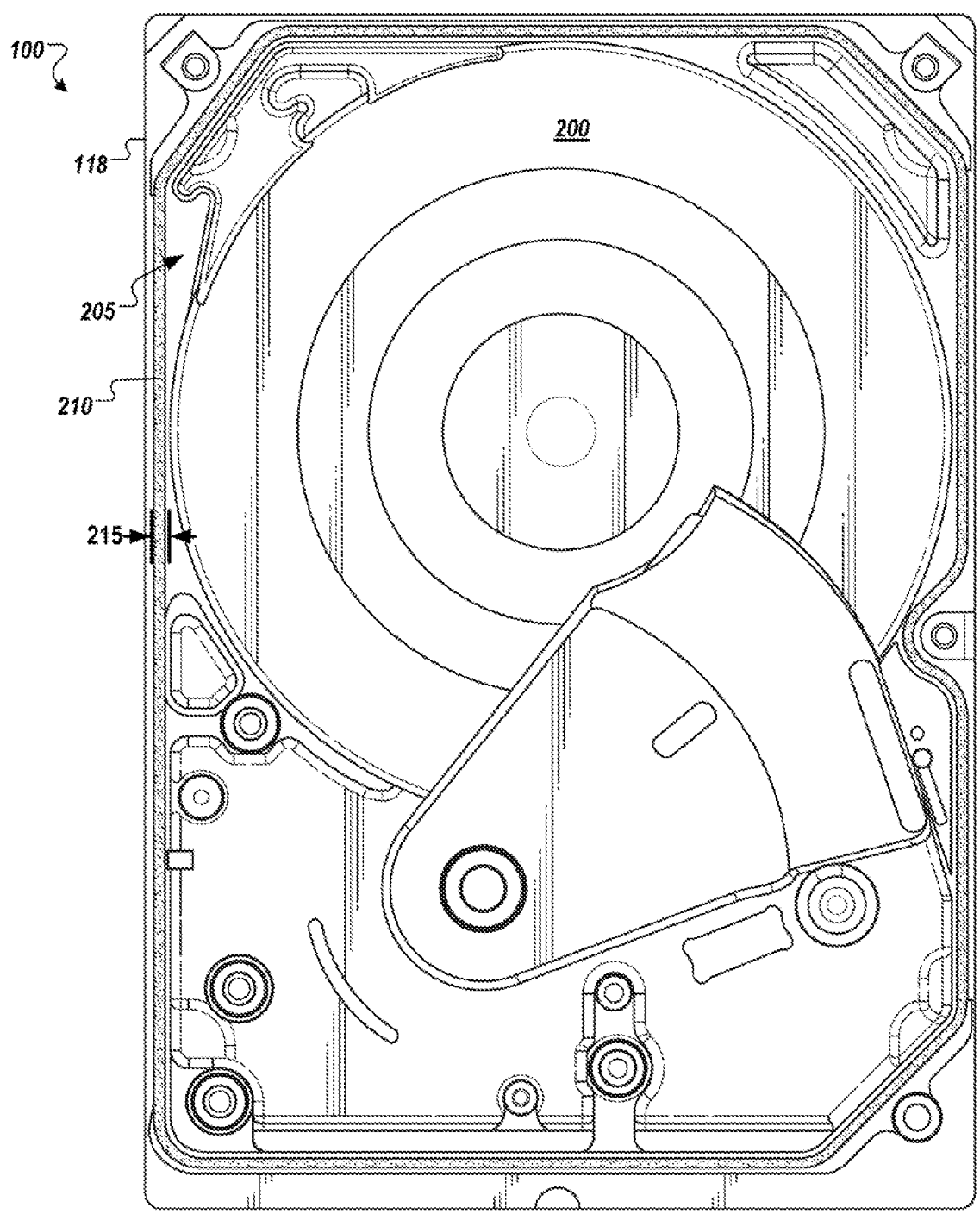
FIG. 2 is a top view of a storage device illustrating a seal according to related art.

FIG. 2 is a top view of a storage device 100 illustrating a seal 210 according to related art. As illustrated, the storage drive base 118 includes an upper peripheral surface 205 that surrounds the interior of the storage device 100. When the storage device 100 is assembled, this upper peripheral surface 205 faces the cover 122. In the related art, a seal 210 is applied to this upper peripheral surface 205 to prevent gas escaping from the interior 200 of the storage device 100. In the related art, this seal 210 is a formed-in-place gasket (FIPG). In other words, the illustrated seal 210 is formed in-place as a narrow bead around the peripheral surface 205 of the storage drive base 118 by the application of molten or liquid gasket material to the peripheral surface 205 of the storage drive base 118 by an injector mechanism (not illustrated). Once the FIPG seal 210 bead has been applied around the entire peripheral surface 205 of the storage drive base 118, the material is cured using heat, light, or other known curing methods to form a solid, pliable gasket. In some related art designs, the seal 210 may be formed on the cover 122 and in some related art designs the seal 210 may be formed on the storage drive base 118. However, the narrow thickness 215 of the bead can cause an increased chance of leakage in the assembled storage device 100. Further, various factors including variations in injector pressure, clogging of the injector nozzle, etc. can cause a non-uniform application of the liquid or molten gasket material. If the application of the liquid or molten gasket material is not uniform, the seal 210 may have variations in height and/or thickness increasing the chances of leakage of Helium in the assembled drive.

Figure 3:
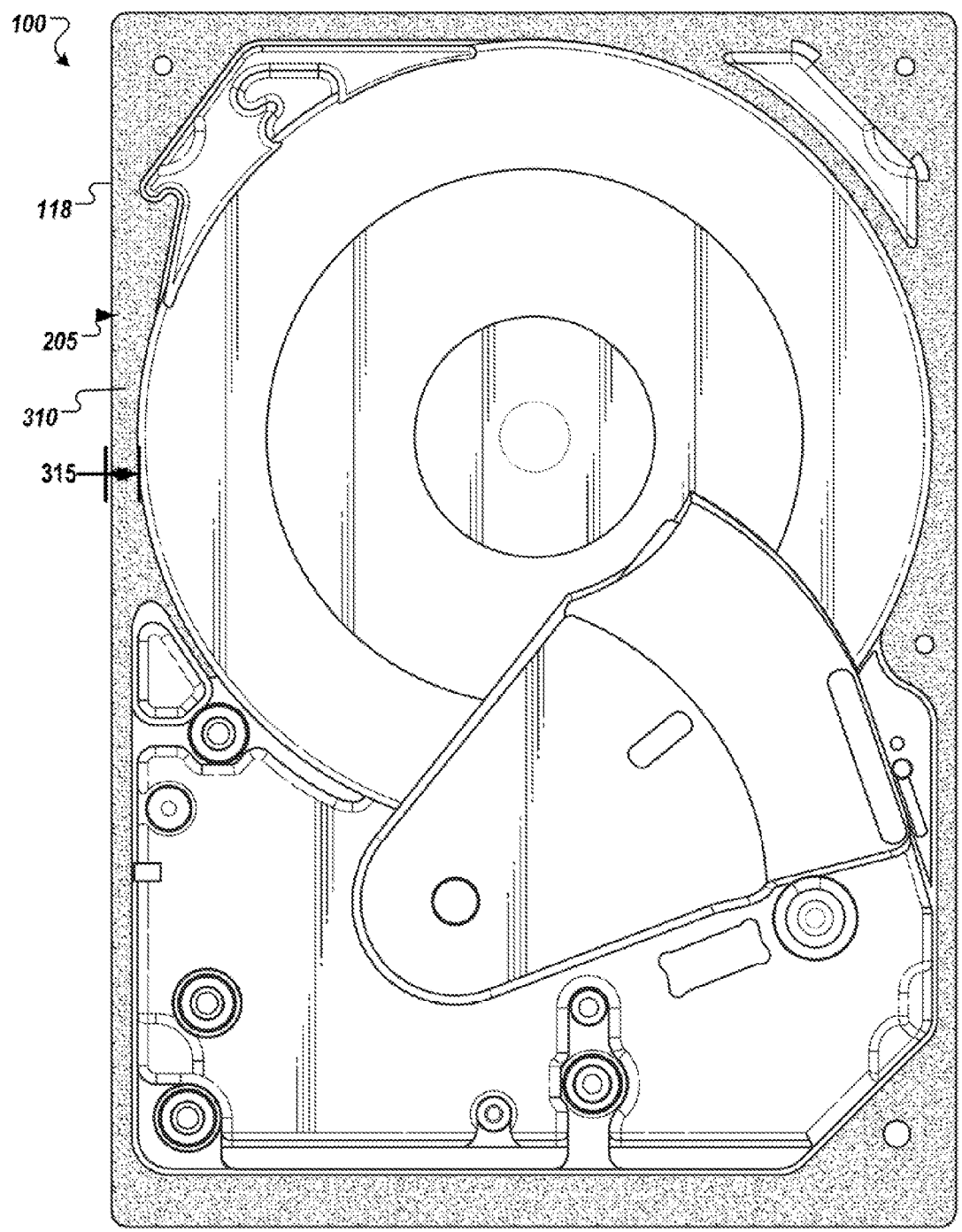
FIG. 3 is a top view of a storage device illustrating a sealing gasket sheet according to an embodiment of the present application.
Figure 4:
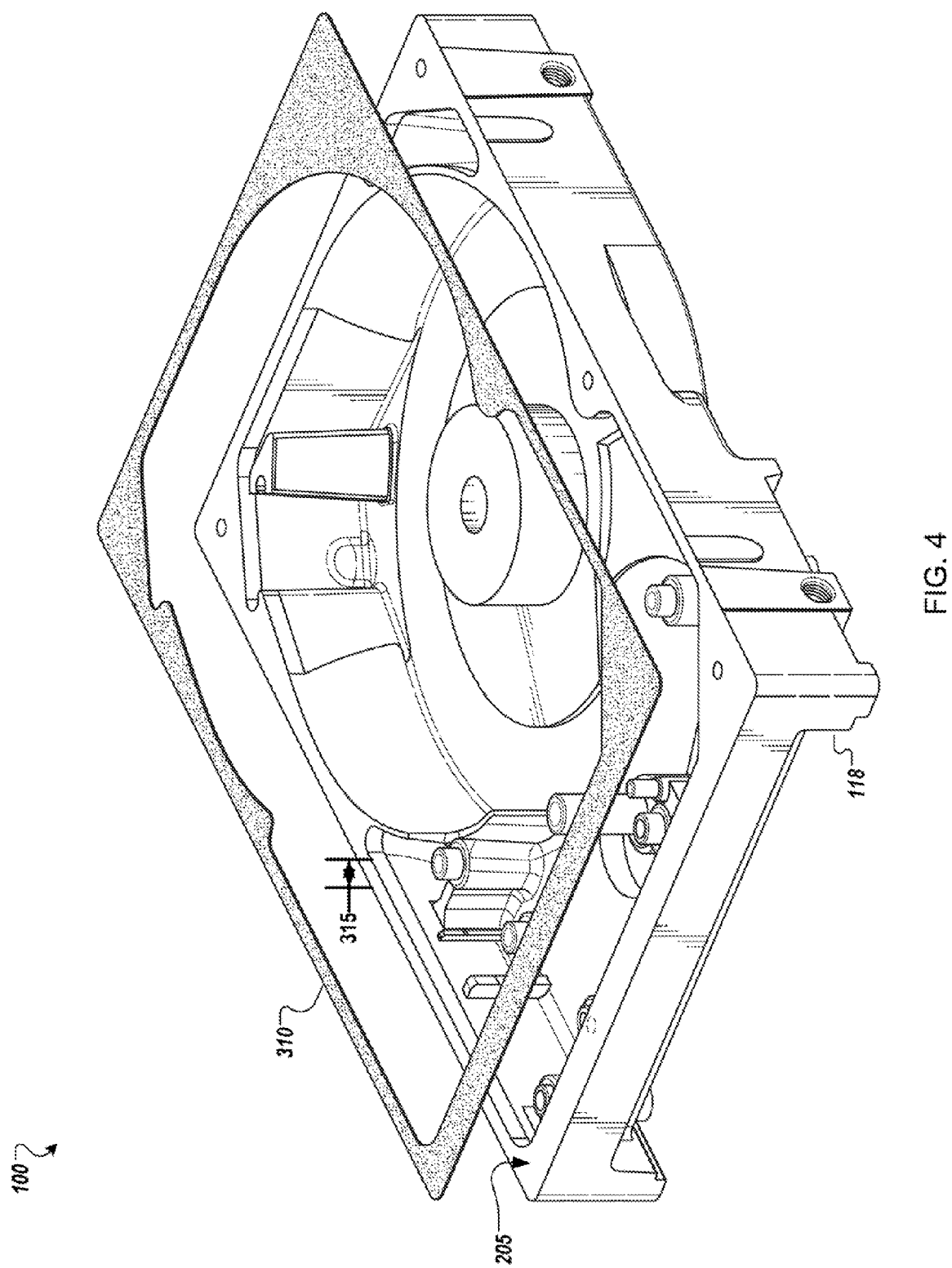
FIG. 4 is an exploded, perspective view of a storage device illustrating the sealing gasket sheet according to an embodiment of the present application.

FIG. 3 is a top view of a storage device 100 illustrating a sealing gasket sheet 310 according to an embodiment of the present application. FIG. 4 is an exploded, perspective view of a storage device 100 illustrating the sealing gasket sheet 310 according to an embodiment of the present application. As illustrated, the sealing gasket sheet 310 is pre-formed as a sheet material that is applied to the upper peripheral surface 205 of the storage drive base 118 in a preformed state. As discussed below the sealing gasket sheet 310 has a laminated structure formed of a plurality of layers. In some embodiments, the sealing gasket sheet 310 is formed as a double-coated composite tape that is die-cut and adhesively bonded on one side to upper peripheral surface 205 of the storage drive base 118. The other side of sealing gasket sheet 310 may be attached to the cover 122 by adhesive (not illustrated). In some embodiments, the sealing gasket sheet 310 may be assembled as part of the cover 122 and will be installed using the same process. The sealing gasket sheet 310 may have a foot print or shape that conforms to the features of an upper peripheral sealing surface 205 of the storage drive base 118 to maximize the sealing land between the sealing gasket sheet 310 and the storage drive base 118. As illustrated, the sealing gasket sheet 310 has a thickness 315 that is significantly greater than the thickness 215 of the seal 210 illustrated in FIG. 2.

In some example embodiments, the sealing gasket sheet 310 may be connected to both the storage drive base 118 and the cover 122 to providing a hermetic sealing. In some example embodiments, the sealing gasket sheet 310 being connected to both the storage drive base 118 and the cover 122 may provide a screw-less attachment mechanism and eliminate the need to use a plurality of screws 140. Eliminating the need to use a plurality of screws 140 may reduce particle generation due to screw torque and may also reduce cycle times for assembly lines.

Figure 5:
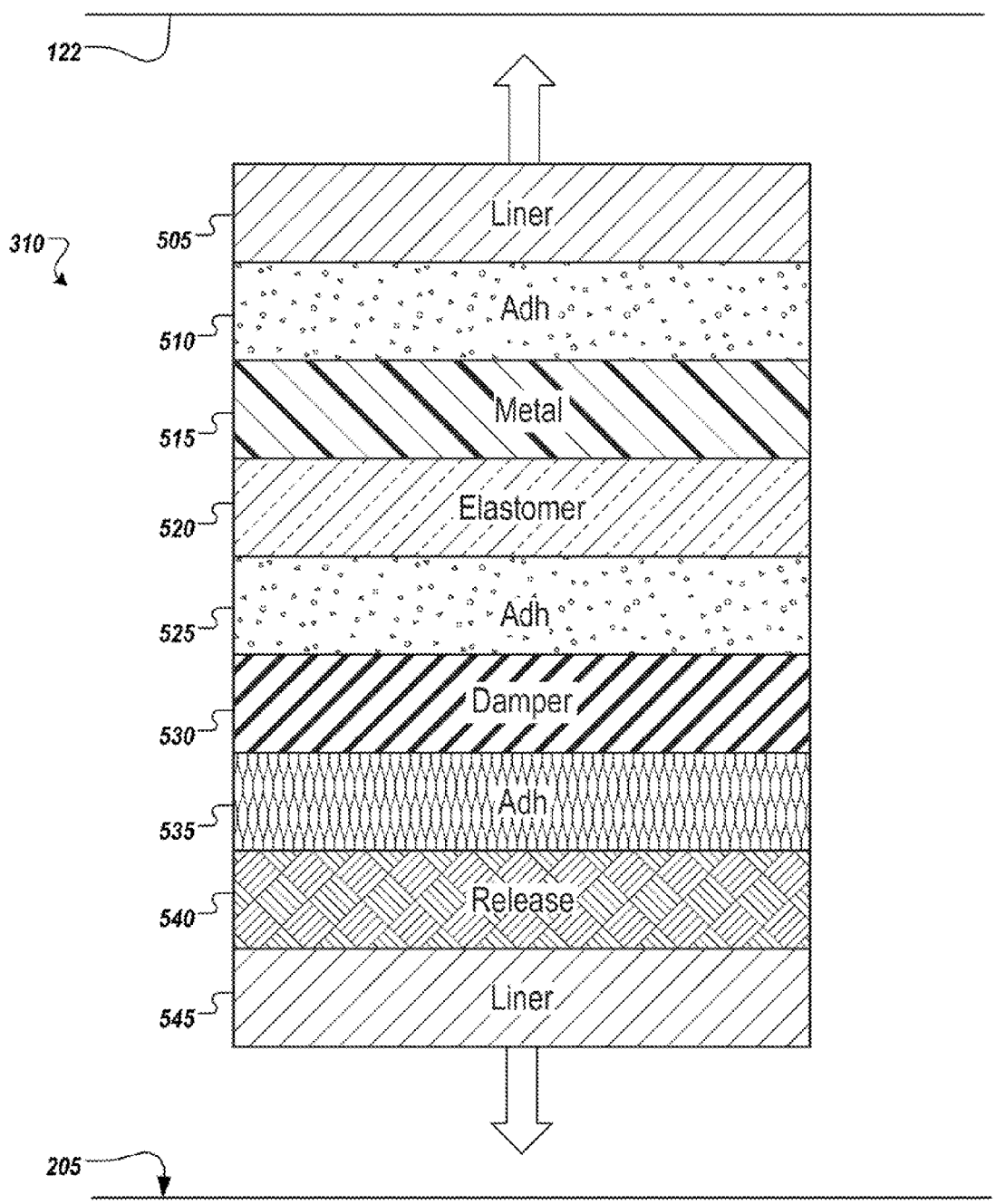
FIG. 5 is a cross-section view of the sealing gasket sheet according to an embodiment of the present application.

FIG. 5 is a cross-section view of the sealing gasket sheet 310 according to an embodiment of the present application. As illustrated, the sealing gasket sheet 310 may include removable upper and lower liners 505, 545 on the upper and lower sides prior to attachment to the upper peripheral sealing surface 205 of the storage drive base 118 and/or the cover 122. In some embodiments, the upper and lower liners 505, 545 may be formed from paper, wax, polyester, or any other clean room approved liner material.

On the upper surface of the sealing gasket sheet 310, a first adhesive layer 510 is provided below the upper liner 505. In some implementations, the first adhesive layer 510 could be optimized for thickness and adhesion to maximize sealing capability. In some implementations, the first adhesive layer 510 may be a dry adhesive layer. Further, in some implementations, the first adhesive layer 510 may be an acrylic-based dry adhesive layer. In some implementations, it could also be a pressure sensitive adhesive layer. Below the first adhesive layer 510, a thin metal layer (such as a metallic foil or film) 515 may be provided to give the sealing gasket sheet 310 an increased rigidity in some embodiments. In some embodiments, the metal layer 515 may be formed from aluminum, copper, platinum, stainless steel, or any other clean room approved metal.

As illustrated, the sealing gasket sheet 310 may also optionally include an elastomeric or elastomeric-based adhesive layer 520 formed below the thin metallic foil or film 515. The elastomeric layer 520 may provide cushioning between the cover 122 and the storage drive base 118. The elastomeric layer 520 may also help prevent acoustic transmission through the sealing gasket sheet 310. In some example embodiments, the elastomeric layer 520 may be formed from any elastomeric foam material that may be apparent to a person of ordinary skill in the art. For example, the elastomeric layer 520 may be formed from EPM foam, Viton foam, etc.

A second adhesive layer 525 may be provided below the elastomeric layer 520. In some implementations, this second adhesive layer 525 may also be a dry adhesive layer or an acrylic-based dry adhesive layer, like the first adhesive layer 510 discussed above.

In some embodiments, a damper or dampening layer 530 may be provided below the second adhesive layer 525. The dampening layer 530 may reduce shock or vibration transmission between the cover 122 and the storage drive base 118. The dampening layer 530 may be formed from any acoustically dampening material, such as a viscoelastic material, balsa material, leather material, or any other material that may be apparent to a person of ordinary skill in the art.

A third adhesive layer 535 may be provided below the dampening layer 530. The third adhesive layer 535 may be an acrylic based adhesive. A releasing agent layer 540 may be provided between the third adhesive layer 535 and the lower liner 545 discussed above to allow clean release of the third adhesive layer 535 from the lower liner 545 during assembly of the storage device 100. The releasing agent layer 540 may be formed from a mold releasing agent, a fluoroethylene-based agent, a silicone-based agent, or any other material that may be apparent to a person ordinary skill in the art.

The upper and lower liners 505 and 545 may typically be removed prior to installation between the storage drive base 118 and the cover 122. During assembly of a storage device 100, the removal of the upper liner 505 from the sealing gasket sheet 310 prior to attachment to a cover 122 may be a simple additional step added to the manufacturing process. Similarly, the removal of the lower liner 545 may be done prior to attaching the cover 122 to the storage drive base 118 using existing storage drive assembly processes. After the upper liner 505 is removed, the first adhesive layer 510 (e.g., a pressure sensitive adhesive layer) can be optionally removed and reapplied in a rework situation.

As illustrated, the individual layers 505-545 may have substantially the same thickness in some embodiments. However, embodiments of the present application are not limited to this configuration and the relative thickness of individual layers may be adjusted based on the specific parameters of the storage device 100 in which the sealing gasket sheet 310 is being installed. Further, the above discussed individual layers 505-545 may be substituted, combined together, or separated into sub-layers as may be apparent to a person of ordinary skill in the art.

Figure 6:
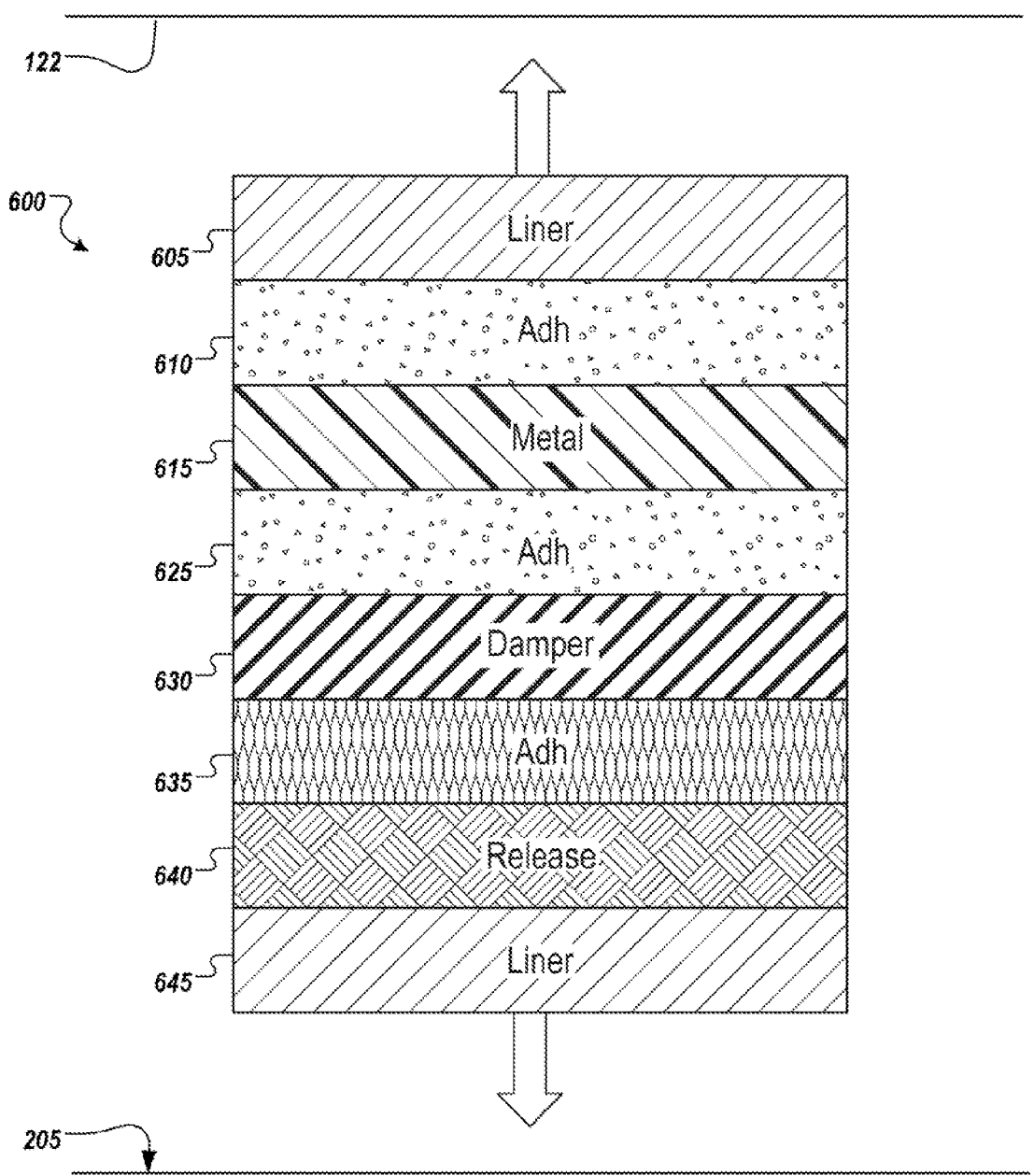
FIG. 6 is a cross-section view of the sealing gasket sheet according to an embodiment of the present application.

FIG. 6 is a cross-section view of the sealing gasket sheet 600 according to an embodiment of the present application. The sealing gasket sheet 600 has a similar construction as the sealing gasket sheet 310 discussed above with respect to FIG. 5. However, in the sealing gasket sheet 600 some layers have been omitted. The sealing gasket sheet 600 may include removable upper and lower liners 605, 645 on the upper and lower sides prior to attachment to an upper peripheral sealing surface 205 of the storage drive base 118 and/or the cover 122. In some embodiments, the upper and lower liners 605, 645 may be formed from paper, wax, polyester, or any other clean room approved liner material.

On the upper surface of the sealing gasket sheet 600, a first adhesive layer 610 is provided below the upper liner 605. In some implementations, the first adhesive layer 610 may be a dry adhesive layer. Further, in some implementations, the first adhesive layer 610 may be an acrylic-based dry adhesive layer. Below the first adhesive layer 610, a thin metal layer (such as a metallic foil or film) 615 may be provided to give the sealing gasket sheet 600 an increased rigidity. In some embodiments, the metal layer 615 may be formed from aluminum, copper, platinum, stainless steel, or any other clean room approved metal.

Unlike the sealing gasket sheet 310 of FIG. 5, the sealing gasket sheet 600 features a second adhesive layer 625 directly below the metal layer 615 without an elastomeric layer being provided. In some implementations, this second adhesive layer 625 may also be a dry adhesive layer or an acrylic-based dry adhesive layer, like the first adhesive layer 610 discussed above.

Below the second adhesive layer 625, the sealing gasket sheet 600 includes a damper or dampening layer 630. The dampening layer 630 may reduce shock or vibration transmission between the cover 122 and the storage drive base 118. The dampening layer 630 may be formed from any acoustically dampening material, such as a viscoelastic material, balsa material, leather material, or any other material that may be apparent to a person of ordinary skill in the art.

A third adhesive layer 635 may be provided below the dampening layer 630. The third adhesive layer 635 may be an acrylic based adhesive. A releasing agent layer 640 may be provided between the third adhesive layer 635 and the lower liner 645 discussed above to allow clean release of the third adhesive layer 635 from the lower liner 645 during assembly of the storage device 100. The releasing agent layer 640 may be formed from a mold releasing agent, a fluoroethylene-based agent, a silicone-based agent, or any other material that may be apparent to a person ordinary skill in the art.

Again, the upper and lower liners 605 and 645 may typically be removed prior to installation between the storage drive base 118 and the cover 122. During assembly of a storage device 100, the removal of the upper liner 605 from the sealing gasket sheet 600 prior to attachment to a cover 122 may be a simple additional step added to the manufacturing process. Similarly, the removal of the lower liner 645 may be done prior to attaching the cover 122 to the storage drive base 118 using existing storage drive assembly processes.

In FIG. 6, the individual layers 605-615 and 625-645 are illustrated as having substantially the same thickness. However, embodiments of the present application are not limited to this configuration and the relative thickness of individual layers may be adjusted based on the specific parameters of the storage device 100 in which the sealing gasket sheet 600 is being installed. Further, the above discussed individual layers 605-615 and 625-645 may be substituted, combined together, or separated into sub-layers as may be apparent to a person of ordinary skill in the art.

Figure 7:
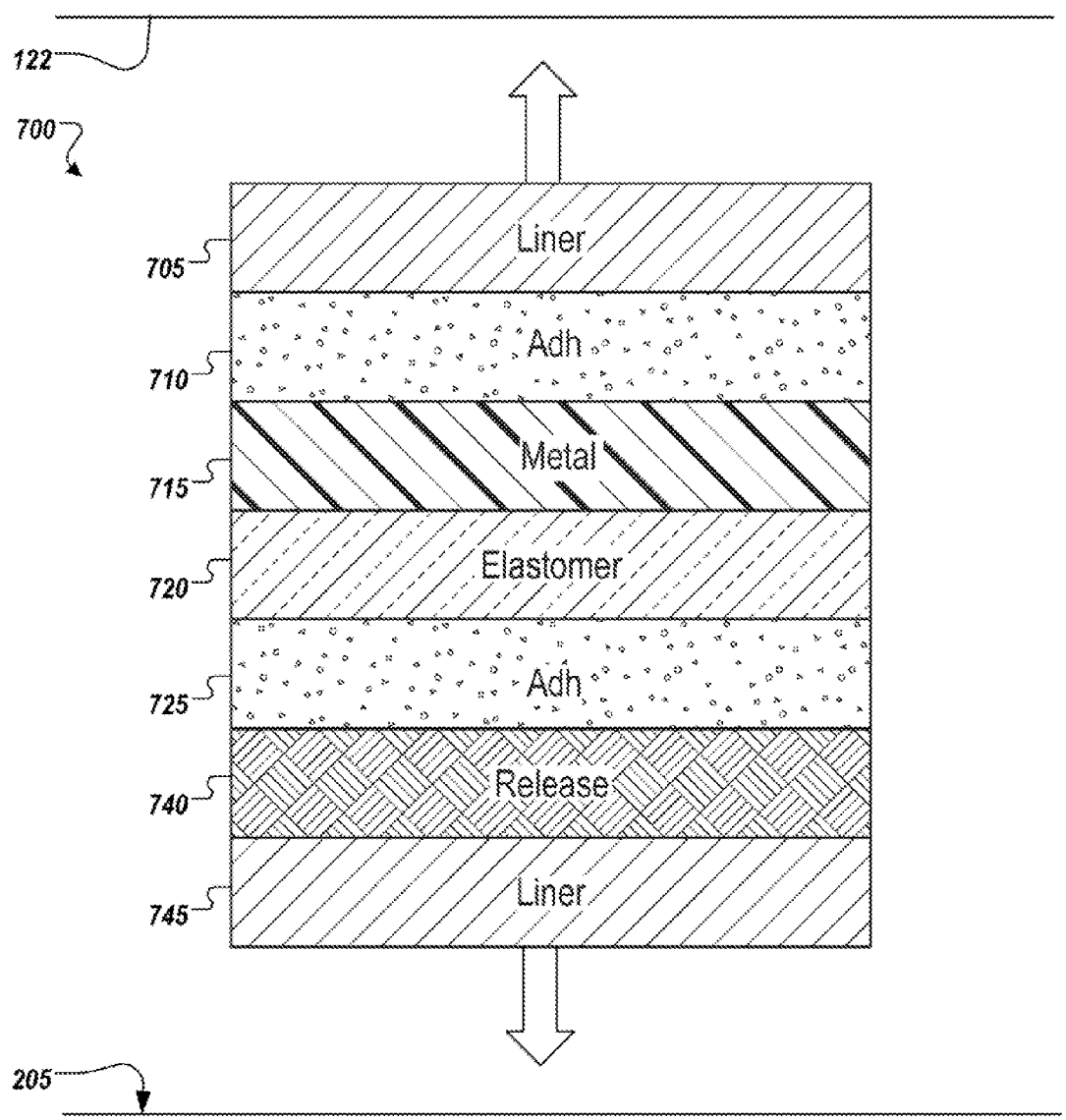
FIG. 7 is a cross-section view of the sealing gasket sheet according to an embodiment of the present application.

FIG. 7 is a cross-section view of the sealing gasket sheet 700 according to an embodiment of the present application. As illustrated, the sealing gasket sheet 700 has a similar construction as the sealing gasket sheet 310 discussed above with respect to FIG. 5. However, in the sealing gasket sheet 700 some layers have been omitted. The sealing gasket sheet 700 may include removable upper and lower liners 705, 745 on the upper and lower sides prior to attachment to an upper peripheral sealing surface 205 of the storage drive base 118 and/or the cover 122. In some embodiments, the upper and lower liners 705, 745 may be formed from paper, wax, polyester, or any other clean room approved liner material.

On the upper surface of the sealing gasket sheet 700, a first adhesive layer 710 is provided below the upper liner 705. In some implementations, the first adhesive layer 710 may be a dry adhesive layer. Further, in some implementations, the first adhesive layer 710 may be an acrylic-based dry adhesive layer. Below the first adhesive layer 710, a thin metallic foil or film 715 may be provided to give the sealing gasket sheet 700 an increased rigidity. In some embodiments, the metallic foil or film 715 may be formed from aluminum, copper, platinum, stainless steel, or any other clean room approved metal.

As illustrated, an elastomeric or elastomeric-based adhesive layer 720 may optionally be formed below the thin metallic foil or film 715. The elastomeric layer 720 may provide cushioning between the cover 122 and the storage drive base 118. The elastomeric layer 720 may also help prevent acoustic transmission through the sealing gasket sheet 700. In some example embodiments, the elastomeric layer 720 may be formed from any elastomeric foam material that may be apparent to a person of ordinary skill in the art. For example, the elastomeric layer 720 may be formed from EPM foam, Viton foam, etc.

A second adhesive layer 725 may be provided below the elastomeric layer 720. In some implementations, this second adhesive layer 725 may also be a dry adhesive layer or an acrylic-based dry adhesive layer, like the first adhesive layer 710 discussed above.

Unlike the sealing gasket sheet 310 in FIG. 5, the sealing gasket sheet 700 features a releasing agent layer 740 directly below the second adhesive layer 725 without a dampening layer or third adhesive layer therebetween. The releasing agent layer 740 may allow clean release of the second adhesive layer 725 from the lower liner 745 during assembly of the storage device 100. The releasing agent layer 740 may be formed from a mold releasing agent, a fluoroethylene-based agent, a silicone-based agent, or any other material that may be apparent to a person ordinary skill in the art.

The upper and lower liners 705 and 745 may typically be removed prior to installation between the storage drive base 118 and the cover 122. During assembly of a storage device 100, the removal of the upper liner 705 from the sealing gasket sheet 700 prior to attachment to a cover 122 may be a simple additional step added to the manufacturing process. Similarly, the removal of the lower liner 745 may be done prior to attaching the cover 122 to the storage drive base 118 using existing storage drive assembly processes.

In FIG. 7, the individual layers 705-725 and 740-745 are illustrated as having substantially the same thickness. However, embodiments of the present application are not limited to this configuration and the relative thickness of individual layers may be adjusted based on the specific parameters of the storage device 100 in which the sealing gasket sheet 700 is being installed. Further, the above discussed individual layers 705-725 and 740-745 may be substituted, combined together, or separated into sub-layers as may be apparent to a person of ordinary skill in the art.

Using embodiments of the present application, the described composite gasket (such as sealing gasket sheet 310, 600, 700) may be removed and replaced for the entire storage device 100 if needed. This removal and replacement may save sealing costs and allow reworkability of a storage drive. Some embodiments of the present application may also prolong the Helium retention inside the drive during the Helium filling process and may also reduce a need to discharge and charge Helium in the drive. In some embodiments, gases other than Helium may be used, such as Nitrogen or any other gas that is not standard air. However, example embodiments of the present application need not achieve these or any other benefits.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions, and changes in the form of the methods and systems described herein may be made without departing from the spirit of the protection. The accompanying claims and their equivalents are intended to cover such forms or modifications as would fall within the scope and spirit of the protection.

We claim:

1. A storage device, comprising:
an enclosure comprising
a storage drive base;
a cover; and
a sealing gasket sheet placed between the storage drive base and the cover; the sealing gasket sheet comprising:
a first adhesive layer;
a metal layer contacting the first adhesive layer;
a second adhesive layer disposed under the metal layer;
a damper layer contacting the second adhesive layer; and
a third adhesive layer contacting the damper layer.

2. The storage device of claim 1, wherein the sealing gasket sheet further comprises an elastomeric layer.

3. The storage device of claim 2, wherein elastomeric layer is disposed between the metal layer and the second adhesive layer.

4. The storage device of claim 1, wherein the storage drive base has a peripheral sealing surface; and
wherein the sealing gasket sheet has a shape configured to conform to the peripheral sealing surface of the storage drive base.

5. The storage device of claim 1, wherein the sealing gasket sheet provides a screw-less attachment mechanism between the cover and the storage drive base.

6. The storage device of claim 1, wherein the sealing gasket sheet further comprises an elastomeric layer disposed below the metal layer.

7. The storage device of claim 6, wherein the storage drive base has a peripheral sealing surface; and
wherein the sealing gasket sheet has a shape configured to conform to the peripheral sealing surface of the storage drive base.

8. The storage device of claim 6, wherein the sealing gasket sheet provides a screw-less attachment mechanism between the cover and the storage drive base.

9. A sealing gasket sheet configured for sealing a storage drive, the sealing gasket sheet comprising:
a first adhesive layer;
a metal layer contacting the first adhesive layer;
a second adhesive layer disposed under the metal layer;
a damper layer contacting the second adhesive layer; and
a third adhesive layer contacting the damper layer.

10. The sealing gasket sheet of claim 9, further comprises an elastomeric layer.

11. The sealing gasket sheet of claim 10, wherein elastomeric layer is disposed between the metal layer and the second adhesive layer.

12. The sealing gasket sheet of claim 9, wherein the sealing gasket sheet has a shape configured to conform to a peripheral sealing surface of a storage drive base of a storage drive.

13. The sealing gasket sheet of claim 9, further comprising an elastomeric layer disposed below the metal layer.

14. The sealing gasket sheet of claim 13, wherein the sealing gasket sheet has a shape configured to conform to a peripheral sealing surface of a storage drive base of a storage drive.

* * * * *